Figure 1:
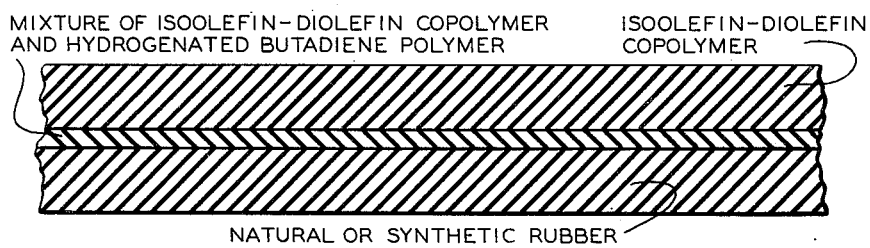

May 22, 1962  R. V. JONES ET AL  3,035,954
LAMINATED RUBBER ARTICLES AND PROCESS OF PRODUCING THE SAME
Filed Sept. 12, 1958

INVENTORS
R.V. JONES
J.F. SVETLIK, SR.
BY
ATTORNEYS

United States Patent Office 3,035,954
Patented May 22, 1962

3,035,954
LAMINATED RUBBER ARTICLES AND PROCESS OF PRODUCING THE SAME
Rufus V. Jones, Bartlesville, Okla., and Joseph F. Svetlik, Sr., Akron, Ohio, assignors to Phillips Petroleum Company, a corporation of Delaware
Filed Sept. 12, 1958, Ser. No. 760,690
13 Claims. (Cl. 154—43)

This invention is a continuation-in-part of our application Serial No. 500,684, filed April 11, 1955, now abandoned.

This invention relates to new polymer compositions comprising a blend of butyl rubber and a hydrogenated polymer of butadiene. In a further aspect this invention relates to a new method of preparing laminates of rubbery materials. In a further aspect this invention relates to the use of a blend of butyl rubber and a hydrogenated polymer of butadiene as a bonding agent for rubbery materials. In a further aspect this invention relates to a laminate of a layer of butyl rubber and a layer of a hydrogenated polymer of butadiene.

It is frequently desirable to prepare a rubber structure in which two or more kinds of rubbery materials are present. An example of such a product is the tubeless automobile tire now widely used. In such articles a layer of butyl rubber is used rather than a separate tube in the tire. For satisfactory operation, it is desirable that the different layers be firmly adherent. It has been found, however, that different types of rubbery materials differ so greatly in their reactions to compounding filling, and vulcanizing ingredients that it is difficult to form bonds of adequate strength. This difficulty is especially great when bonding butyl rubber to natural or synthetic rubber and has limited its use on this count.

According to one aspect of this invention, new rubbery compositions are made, these comprising a blend of butyl rubber and a hydrogenated polymer of butadiene. These compositions are especially valuable in that they can be used to bond butyl rubber to natural or synthetic rubber. Because of this property, they are used as an interlayer between the butyl rubber and the other rubber. The new compositions are highly ozone resistant and have low air permeability. Because of this feature the new compositions are also used as coating compositions on articles made of rubber in order to protect these articles from ozone deterioration. A particularly valuable use of these new compositions is that of a coating material for foam rubber products. Because of their light color, pigments can be incorporated in the coating to give any desired color therein. Colored side wall tires as well as white side wall tires are made by the use of this material as a coating for the tire.

Another aspect of the invention relates to the production of laminates comprising a layer of butyl rubber and a layer of a hydrogenated polymer of butadiene. This is based upon the discovery that strong bonds are obtained when these materials are cured in contact with each other.

The following are objects of this invention.

An object of this invention is to provide a new composition comprising a blend of butyl rubber with a hydrogenated polymer of butadiene. A further object of this invention is to provide a method for the production of rubber laminates. A further object of this invention is to provide an ozone resistant coating for rubbery materials.

Other objects and advantages will be apparent to one skilled in the art upon reading this disclosure.

Figure 2:
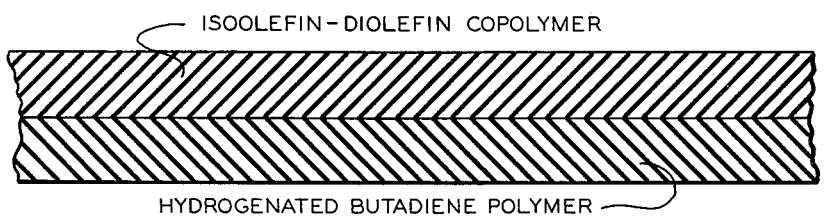

The drawing shows cross sectional views of laminates according to the present invention, FIGURE 1 showing a 3-ply laminate and FIGURE 2 showing a 2-ply laminate, the composition of the individual plies being identified on the drawing.

The following examples set forth preferred modification of products illustrating the various aspects of our invention. Example I shows the new composition of this invention and discloses the good properties of the new composition. Especially important is the good ozone resistance of this blend. Examples II–IV disclose uses of this blend wherein the superior bonding ability of these compositions is illustrated, and the remaining examples show that strong bonds are obtained between butyl rubber and a hydrogenated polymer of butadiene.

*Example I*

Rubbery polybutadiene was prepared by emulsion polymerization at 41° F. in accordance with the following recipe.

| | Parts by weight |
|---|---|
| Water | 180 |
| Butadiene | 100 |
| Santomerse No. 3 [1] | 1.25 |
| $K_4P_2O_7$ | 0.177 |
| $FeSO_4 \cdot 7H_2O$ | 0.140 |
| KOH | 0.04 |
| Tert-butylisopropylbenzene hydroperoxide | 0.104 |
| Mercaptan blend [2] | 0.46 |
| Shortstop: Dinitrochlorobenzene | 0.15 |
| Antioxidant: Phenyl-beta-naphthylamine (percent, based on polymer) | 1.5 |
| Polymerization time, hours | 13.8 |
| Conversion, percent | 60 |
| Mooney value, ML–4 | 30 |

[1] Alkyl aryl sodium sulfonate.
[2] A blend of tertiary $C_{12}$, $C_{14}$ and $C_{16}$ aliphatic mercaptans of 3:1:1 parts by weight.

The rubber was coagulated from the latex with isopropyl alcohol.

Two hundred fifty grams of the rubbery polybutadiene, prepared as described above, dispersed in 3 liters of methylcyclohexane was charged to a reactor and 125 grams of reduced nickel on kieselguhr catalyst in 1 liter of methylcyclohexane was added. An additional liter of methylcyclohexane was used as a rinse to transfer the materials to the reactor. The reactor was flushed with hydrogen and then pressured to 500 p.s.i.g. with hydrogen. The reaction mixture was heated to 350° F. and held at this temperature for 4 hours. The catalyst was removed by magnetic separation according to the method disclosed in Jones et al. Patent No. 2,786,047, and the hydrogenated polymer was precipitated with isopropyl alcohol and dried. The product had an unsaturation of 22.8 percent.

The hydrogenated polybutadiene was blended on a mill with butyl rubber and the blend compounded in accordance with the following recipe:

| | Parts by weight |
|---|---|
| Hydrogenated polybutadiene | 90 |
| Butyl rubber | 10 |
| Titanium dioxide | 50 |
| Zinc oxide | 5 |
| Agerite Alba [1] | 1 |
| Stearic acid | 2 |
| Circo-lite oil [2] | 10 |
| Sulfur | 2 |
| Santocure [3] | 1 |
| A–32 [4] | 0.2 |

[1] Hydroquinone monobenzyl ether.
[2] Odorless, light gold-colored oil; sp. gr. 0.92; Saybolt Furol viscosity at 100° F. about 155 seconds.
[3] N-cyclohexyl-2-benzothiazylsulfenamide.
[4] Reaction product of butyraldehyde and butylidene aniline.

The compounded stock was cured 45 minutes at 307°

F. and physical properties determined. Results were as follows.

| | |
|---|---|
| 300 percent modulus, p.s.i., 80° F | 790 |
| Tensile, p.s.i., 80° F | 1440 |
| Elongation, percent, 80° F | 440 |
| Resistance to tear, p.s.i., 80° F | 165 |
| Resistance to tear, p.s.i., 158° F | 45 |
| Resilience, percent | 76.5 |
| Shore hardness, 80° F | 77 |
| Shore hardness, 30 min. at −35° F | 93 |
| Compression set, percent: | |
| 2 hours at 212° F | 12.0 |
| 22 hours at −35° F.— | |
| 10 seconds | 92.1 |
| 30 minutes | 87.4 |
| Gehman freeze point, ° C | −54 |
| Ozone resistance [1] | 0 |
| Milling temperature, ° F | 200 |
| Swelling in toluene/isooctane solution, percent | 100.4 |

[1] On rating scale 0=best, 10=poorest. Natural rubber control=6.5.

*Example II*

Rubbery polybutadiene was prepared by emulsion polymerization at 41° F. in accordance with the following recipe.

| | Parts by weight |
|---|---|
| Water | 200 |
| Methanol rinse | 0.2 |
| Butadiene | 100 |
| Potassium fatty acid soap[1] | 0.5 |
| Santomerse No. 3[2] | 2.0 |
| KOH | 0.06 |
| $K_4P_2O_7$ | 0.099 |
| $FeSO_4.7H_2O$ | 0.083 |
| Diisopropylbenzene hydroperoxide | 0.064 |
| Tert-$C_{12}$ mercaptan | 0.50 |
| Shortstop: Di-tert-butylhydroquinone | 0.2 |
| Antioxidant: Polygard[3] (percent, based on polymer) | 1.0 |
| Polymerization time, hours | 10.2 |
| Conversion, percent | 60 |
| Mooney value, ML-4 | 30 |

[1] Potassium Office Synthetic Rubber soap.
[2] As in Example I.
[3] Tris-nonylphenyl phosphite.

Isopropyl alcohol was used to coagulate the rubber from the latex.

The polybutadiene, prepared as described above, was dispersed in methylcyclohexane and hydrogenated in the presence of reduced nickel on kieselguhr in a manner similar to that described in Example I. The reactor was flushed with hydrogen and then pressured to 500 p.s.i.g. with hydrogen. The reaction mixture was heated to 450° F. and held at this temperature for 3 hours. A portion of the catalyst was removed by centrifugation and the remainder by magnetic separation. To the methylcyclohexane solution of the hydrogenated polymer, containing between 9 and 10 weight percent of the polymer, a small amount of acetic acid was added (approximately 3 cc. glacial acetic acid per gallon of polymer solution, the acid being used as a 10 weight percent aqueous solution), the mixture was heated to 130–150° F. and stirred for about 30 minutes, and the product was recovered by drum drying. It had an unsaturation of 18.8 percent.

The hydrogenated polybutadiene, butyl rubber (2.5 percent by weight isoprene, 97.5 percent by weight isobutylene, Mooney value (ML-8) 71), and GR-S rubber (71/29 weight ratio of butadiene/styrene in monomer charge, approximately 50 Mooney (ML-4) rubber) were each compounded in accordance with the following recipes:

| | A | B | C |
|---|---|---|---|
| Hydrogenated polybutadiene | 100 | | |
| Butyl rubber | | 100 | |
| GR-S | | | 100 |
| Carbon black (Philblack E) | | 50 | |
| Zinc oxide | 5.0 | 5.0 | 5.0 |
| Stearic acid | 3.0 | 3.0 | |
| Reogen[1] | | | 5.0 |
| Easy processing channel black (Wyex) | | | 15 |
| P-33[2] | | | 30 |
| $TiO_2$ | 50 | | |
| Sulfur | 2.0 | 2.0 | 3.0 |
| Altax | 0.5 | 0.5 | 1.5 |
| Methyl tuads[3] | 1.0 | 1.0 | |
| Butyl zimate[4] | | | 0.15 |
| Agerite stalite[5] | 1.0 | | 1.0 |

[1] Mixture of 80 percent mineral oil, 15 percent sulfonated petroleum product, and 5 percent n-butyl alcohol.
[2] Finely divided carbon obtained by thermal decomposition, or cracking, of natural gas.
[3] Tetramethyl thiuram disulfide.
[4] Zinc diethyl dithiocarbamate.
[5] Heptylated diphenylamine.

The stocks were mill mixed on a roll mill and then sheeted from the mill at the thickness desired to give a resulting laminate of approximately 75 mils in thickness approximately equally divided between the 2 or 3 components of the laminate. The sheets were vulcanized in 6″ x 6″ molds to form the laminates. In one instance a 25/75 blend of butyl rubber and hydrogenated polybutadiene was prepared and sheeted from the mill. This blend was used as one ply in the production of a laminate. The stocks were cured 40 minutes at 307° F. Tensile specimens were cut from the cured stocks and pulled at 20 inches per minute. If bonding between the plies were not achieved in the sample, peeling of one ply from another occurred during elongation of the tensile specimen. Small samples were also cut from each slab and immersed in 70/30 isooctane/toluene mixture at 80° F. for 48 hours. This treatment also caused separation of the plies in cases where bonding was poor. Description of the laminates and the tests thereon are shown in the following tabulation, the three ply laminates being assembled in the order shown.

(1) Three plies:
  a. Butyl rubber
  b. 25/75 butyl rubber/hydrogenated polybutadiene
  c. GR-S Did not delaminate when elongated or swelled.

(2) Three plies:
  a. Butyl rubber
  b. Hydrogenated polybutadiene
  c. GR-S

Delaminated when elongated, also when swelled.

(3) Two plies:
  a. Butyl rubber
  b. Hydrogenated polybutadiene

Delaminated when elongated, also when swelled.

(4) Two plies:
  a. Butyl rubber
  b. GR-S

Delaminated when elongated, also when swelled.

Laminates 2 and 3 gave a good bond prior to the point at which the elastic limit of the hydrogenated polybutadiene was exceeded. Thereafter the material laterally contracted and loosened from the butyl. Laminate 4 showed poor bonding even before the tests.

*Example III*

The three compounded stocks described in Example II were employed in preparing 50/50 blends of butyl rubber/hydrogenated polybutadiene and GR-S/butyl rubber.

These blends were sheeted from the mill at the thickness desired and employed in the production of laminates each containing two plies. Curing was effected at 307° F. for 40 minutes. Laminates prepared and results obtained were as follows:

(1) a. 5/50 butyl rubber/hydrogenated polybutadiene
    b. GR-S

Did not delaminate when elongated; delaminated when swelled.

(2) a. Butyl rubber
    b. 50/50 butyl rubber/hydrogenated polybutadiene

Did not delaminate when elongated; delaminated when swelled.

(3) a. Butyl rubber
    b. 50/50 GR-S/butyl rubber

Delaminated when elongated and swelled.

*Example IV*

A series of laminates were prepared and tested for the strength of the bond. The butyl rubber was the same as that used previously and the hydrogenated polybutadiene was the same as that used in Example II, the compounding recipes being given in Example II. The GR-S rubber in this example was a standard 71/29 butadiene/styrene copolymer prepared by emulsion polymerization at 122° F. and was compounded in accordance with the following recipe:

| | Phr. |
|---|---|
| GR-S (X-178) | 100 |
| Zinc oxide | 5.0 |
| Reogen | 5.0 |
| EPC (Wyex) | 15 |
| P-33 | 30 |
| Sulfur | 1.75 |
| Agerite Stalite | 1.0 |
| Santocure [1] | 1.0 |

[1] N-cyclohexyl-2-benzothiazylsulfenamide.

Three ply laminates were made and cured 45 minutes at 307° F. The results of tests made on these laminates were as follows:

(1) a. Butyl rubber
    b. 20/80 butyl rubber/hydrogenated polybutadiene
    c. GR-S Tensile bar delaminated slightly. Resisted swelling in 70/30 isooctane/toluene mixture.

(2) a. Butyl rubber
    b. 15/85 butyl rubber/hydrogenated polybutadiene
    c. GR-S Did not delaminate when elongated or swelled.

(3) a. Butyl rubber
    b. 50/50 butyl rubber/GR-S
    c. GR-S

Delaminated when elongated and swelled.

(4) a. Butyl rubber
    b. 80/20 GR-S/butyl rubber
    c. GR-S

Delaminated slightly when elongated. Delaminated when swelled.

(5) a. Butyl rubber
    b. 85/15 GR-S/butyl rubber
    c. GR-S

Delaminated when elongated and swelled.

(6) a. Butyl rubber
    b. 33.3/33.3/33.3 GR-S/hydrogenated polybutadiene/polybutadiene
    c. GR-S Delaminated when pulled, however, the failure occurred in the blend and not between the plies. When swelled delamination occurred between the butyl and blend.

*Example V*

Rubbery polybutadiene was prepared by emulsion polymerization at 41° F., the recipe for its preparation being as follows.

| | Parts by weight |
|---|---|
| Water | 200 |
| Butadiene | 100 |
| Rosin soap, K salt [1] | 5.0 |
| KOH | 0.1 |
| KCl | 0.5 |
| Daxad 11 [2] | 0.1 |
| Sodium formaldehyde sulfoxylate | 0.1 |
| $FeSO_4 \cdot 7H_2O$ | 0.02 |
| Cumene hydroperoxide | 0.1 |
| Tert-dodecyl mercaptan | Variable |
| Shortstop: Di-tert-butylhydroquinone | 0.3 |
| Polygard [3] | [4] 1.0 |

[1] Dresinate 214; K salt of disproportionated rosin acid.
[2] Sodium salt of condensed alkyl aryl sulfonic acid.
[3] Tris-nonyl phenyl phosphite.
[4] Part per 100 parts rubber.

Three runs were made and the products blended. The average Mooney value (ML-4 at 212° F.) was 20. The amount of mercaptan used in each run and the time-conversion data were as follows:

| Run | Mercaptan used, parts | Time, hours | Conversion, percent |
|---|---|---|---|
| 1 | 0.48 | 16 | 60 |
| 2 | 0.48 | 14 | 60 |
| 3 | 0.42 | 21 | 60 |

Hydrogenation of this rubber was effected in a 5-gallon stainless steel autoclave, which was purged with nitrogen and then with hydrogen prior to charging the ingredients, and a positive hydrogen pressure was maintained during charging. A solution of 800 grams of polybutadiene in 7 liters of methylcyclohexane was prepared and pumped through a heat exchanger, where the temperature was raised to about 275° F., and then into the reactor. Along with the polybutadiene solution was charged 625 cc. of a reduced nickel on kieselguhr catalyst slurry (76 grams of catalyst) which was prepared in the following manner: 250 grams of nickel hydroxide on kieselguhr was reduced with hydrogen at 775° F. for 4 hours and quenched with 1000 cc. of methylcyclohexane. The catalyst slurry was rinsed into the reactor with 875 cc. of methylcyclohexane. After the rubber solution was pumped into the reactor, the lines were rinsed with 2 liters of methylcyclohexane.

The reactor heat was on during charging of the ingredients. As the temperature increased the hydrogen pressure was increased. Hydrogen pressure was maintained as indicated in the following table:

| Time, minutes | Temp., ° F. | Total pressure, p.s.i.g. | Repressure, p.s.i.g. | Remarks |
|---|---|---|---|---|
| 0 | 310 | 150 | 350 | Charging. |
| 13 | 400 | 400 | | Charged. |
| 20 | 445 | 310 | 500 | |
| 50 | 455 | 490 | | |
| 80 | 450 | 440 | 500 | |
| 125 | 450 | 450 | 500 | |
| 175 | 450 | 450 | | |
| 200 | 450 | 440 | | |

The reaction mixture was blown down into a tank containing methylcyclohexane. Three liters of methylcyclohexane was pumped into the reactor to rinse it and then added to the blowdown tank. The mixture was centrifuged to remove a portion of the catalyst and then pressure filtered.

A total of 19 runs were made using this process and the products were combined. To 190 pounds of the polymer solution 24 grams of Polygard and 25 grams of glacial acetic acid in 150 cc. of water were added. The mixture was stirred one hour at 150° F. after which the acetic acid was neutralized by the addition of 16.6 grams of NaOH in 25 cc. of water. The product was dried in a vacuum drum dryer at atmospheric pressure with the air rate through the dryer being 2 cu. ft. min. The dryer was heated with steam at a pressure of about 75 p.s.i.g. The hydrogenated polybutadiene had an unsaturation of 8 percent of the original unsaturation.

A second hydrogenated polymer was prepared from rubbery polybutadiene prepared by emulsion polymerization at 41° F., in accordance with the following formulation.

|  | Parts by weight |
|---|---|
| Water | 220 |
| Butadiene | 100 |
| Rosin soap, K salt | 5.0 |
| KOH | 0.1 |
| KCl | 0.5 |
| Daxad 11 | 0.1 |
| $FeSO_4 \cdot 7H_2O$ | 0.02 |
| Sequestrene AA | 0.023 |
| Sodium formaldehyde sufoxylate | 0.05 |
| p-Menthane hydroperoxide | 0.06 |
| tert-Dodecyl mercaptan | Variable |
| Benzene rinse | 0.25 |
| Shortstop: Di-tert-butylhydroquinone | 0.3 |
| Polygard [1] |  |

[1] Ethylenediamine tetraacetic acid.

Two runs were made and the products blended. The Mooney value of the blend (ML-4 at 212° F.) was 25. Details of the runs are shown below:

| Run | Mercaptan used, parts | Time, hours | Conversion, percent | Blowdown ML-4 | Fraction in blend |
|---|---|---|---|---|---|
| 1 | 0.44 | 6.2 | 58 | 19 | 0.75 |
| 2 | 0.43 | 7.9 | 61 | 38 | 0.25 |

Hydrogenation was effected in a 10-gallon stainless steel autoclave which was purged with nitrogen and then with hydrogen prior to charging the ingredients, and a positive hydrogen pressure was maintained during charging. A solution of 1600 grams of polybutadiene in 24 pounds of methylcyclohexane was prepared and pumped through a heat exchanger, where the temperature was raised to about 300° F., and then into the reactor. Along with the polybutadiene solution was charged 600 cc. of a reduced nickel on kieselguhr catalyst slurry (88 grams of catalyst) which was prepared as set forth in the first part of this example. The catalyst slurry was rinsed into the reactor with 1310 cc. of methylcyclohexane. After the rubber solution was pumped into the reactor, the lines were rinsed with 7 pounds of methylcyclohexane.

The reactor heat was on during charging of the ingredients. As the temperature increased the hydrogen pressure was increased. Hydrogen pressure was maitnained as indicated in the following table:

| Time, minutes | Temperature, ° F. | Total pressure, p.s.i.g. |
|---|---|---|
| 0 | 360 | 275 |
| 7 | 385 | 350 |
| 30 | 445 | [1] 350 |
| 105 | 450 | 510 |
| 135 | 455 | 510 |
| 180 | 450 | 510 |
| 210 | 450 | 510 |

[1] The reactor was pressured to 505 p.s.i.g. with hydrogen and the hydrogen regulator was set to maintain 505–510 p.s.i.g.

The reaction mixture was blown down into a tank which was previously charged with 45 pounds of methylcyclohexane. The mixture was centrifuged to remove a portion of the catalyst and then pressure filtered.

A total of nine runs were made using this process and the products were combined. To 740 pounds of the polymer solution 418 grams of Polygard and 20 cc. of glacial acetic acid in 50 cc. of water were added. The mixture was stirred 3 hours at 220° F. after which the acetic acid was neutralized by the addition of 14 grams of NaOH in 150 cc. of water. The hydrogenated polymer was precipitated with water and vacuum dried 8 hours at 200° F. It had a residual unsaturation of 17 percent of the original unsaturation.

These two hydrogenated polymers and two butyl rubbers (WR-I-217 and GR-I-218) were compounded and cured 30 minutes at 307° F. The compounding recipes, amounts being given in parts by weight, and the physical properties are set forth in the following table.

| Stock No. | 1 | 2 | 3 | 4 | 5 | 6 |
|---|---|---|---|---|---|---|
| Hydrogenated polymer (8%) | 100 | 100 |  |  |  |  |
| Hydrogenated polymer (17%) |  |  | 100 | 100 |  |  |
| GR-I-217 |  |  |  |  | 100 |  |
| GR-I-218 |  |  |  |  |  | 100 |
| Titanium dioxide | 50 | 50 | 50 | 50 |  |  |
| HAF carbon black (Philblack O) |  |  |  |  | 50 |  |
| SAF carbon black (Philblack E) |  |  |  |  |  | 50 |
| Zinc oxide | 5 | 5 | 5 | 5 | 5 | 5 |
| Stearic acid | 1.5 | 3 | 1.5 | 3 | 1 | 3 |
| Sulfur | 1.75 | 2 | 1.75 | 2 | 2 | 2 |
| Methyl tuads | 1.5 | 1 | 1.5 | 1 | 1.1 | 1.0 |
| Altax (2,2′-dibenzothiazyl disulfide) | 0.75 | 0.5 | 0.75 | 0.5 | 1.1 | 0.5 |
| Agerite stalite |  | 1 |  | 1 |  |  |

PHYSICAL PROPERTIES

| | | | | | | |
|---|---|---|---|---|---|---|
| 100% modulus, p.s.i. | 810 | 760 | 680 | 670 | 310 | 230 |
| 200% modulus, p.s.i. | 975 | 880 | 1,090 | 1,050 | 710 | 540 |
| 300% modulus, p.s.i. | 1,260 | 1,130 | 1,610 | 1,660 | 1,200 | 960 |
| Tensile, p.s.i. | 2,325 | 2,260 | 1,750 | 1,925 | 2,150 | 3,040 |
| Elongation, percent | 470 | 510 | 320 | 335 | 530 | 640 |

The bond strength of the butyl rubber to the hydrogenated polymer was determined in a variety of different methods. In each case the test was made on the L-6 Scott tensile machine operating at 2 inches per minute. The butt splice joints were formed by simultaneously curing two half-slabs of the different compounds in a tensile slat mold. The resulting whole slabs with the two rubbers were spliced approximately in the center of the slab. The tensile dumbbells were cut from the slabs with the splice approximately in the center of the narrow portion of the dumbbell. The other specimens were prepared as the laminates in Example II. These were pulled perpendicular to the bond by separating the layers at one end and pulling these ends. The laminates were also tested by pulling the specimen parallel to the bond. The results are shown in the following table.

| Stocks | 1 to 5 | 2 to 5 | 3 to 5 | 4 to 5 | 1 to 6 | 2 to 6 | 3 to 6 | 4 to 6 |
|---|---|---|---|---|---|---|---|---|
| Butt splice, p.s.i. | 1,660 | 2,240 | 890 | 940 | 2,150 | 2,040 | 1,040 | 1,300 |
| Laminate pulled perpendicular to bond, lb./in. | 11.4 | 21.3 | 7.6 | 6.7 | 14.1 | 14.4 | 8.2 | 10.0 |
| Laminate pulled parallel to bond, p.s.i. | 2,040 | 2,230 | [1] 1,290 | [1] 1,400 | 2,220 | 2,290 | [1] 1,280 | [1] 1,500 |

[1] Strips delaminated when the hydrogenated polymer necked down and broke after exceeding the elastic limit.

*Example VI*

Additional butt splice joints were prepared from the hydrogenated polymer with 8 percent unsaturation of Example V and butyl rubber. The butyl rubber was a commercial product designated as GR–I–17. The compounding recipes were as follows:

|  | Parts by weight | |
|---|---|---|
| Hydrogenated polybutadiene | 100 |  |
| Butyl rubber |  | 100 |
| Pigment or filler | Variable |  |
| Carbon black (Philblack o) |  | 50 |
| Zinc oxide | 5 | 5 |
| Stearic acid | 1.5 | 1.0 |
| Sulfur | 1.75 | 2.0 |
| Methyl tuads | 1.5 | 1.1 |
| Altax | 0.75 | 1.1 |

The compounded stocks were prepared by milling on a warm (158° F.) mill, the sulfur and curatives being added last. Butt splice joints were prepared and tested as in Example V. The results obtained with different fillers are summarized in the tabulation below. These results illustrate the high bond strengths obtained with mineral fillers, particularly with titanium dioxide.

| Pigment or filler | Volume loading, percent | Bond strength, p.s.i. |
|---|---|---|
| Titanium dioxide | 13.5 | 1,320 |
| Do | 27.8 | 855 |
| Whitetex Clay [1] | 13.5 | 1,295 |
| Dixie clay [2] | 13.5 | 960 |
| Hi-Sil 233 [3] | 9.1 | 875 |
| Zinc oxide | 9.1 | 765 |
| Alon C [4] | 9.1 | 1,080 |

[1] Very white complex silicate.
[2] A hard, white-to-cream-colored kaolin mineral filler (aluminum silicate).
[3] Precipitated hydrated silica.
[4] Finely divided gamma aluminum oxide.

The butadiene polymers from which the hydrogenated polymers are prepared include rubbery homopolymers of butadiene and copolymers of butadiene and styrene, using not over 30 parts by weight of styrene per 100 parts by weight of monomers. While the homopolymer was used in the examples, similar results are obtained using the hydrogenated butadiene/styrene copolymers. These polymers are prepared by emulsion polymerization, the temperatures for the polymerization ranging from —50° F. to 140° F., preferably from 20° F. to 60° F.

The rubbery polymer, in the form of a solution or suspension in a suitable solvent, such as cyclohexane, methylcyclohexane, decalin, and the like is hydrogenated in the presence of a nickel-kieselguhr catalyst. The method of hydrogenation does not constitute a portion of our invention but is disclosed and claimed in an application by Jones and Moberly, Serial No. 395,291, filed November 30, 1953. Reference is made to that application for complete details of the process.

The present invention is applicable to hydrogenated polymers containing up to 50 percent of the original unsaturation and those with less than 30 percent are preferred. Where the laminate is butyl rubber applied directly to the hydrogenated polymer, the bond strength is considerably higher when the hydrogenated polymer has had the unsaturation reduced to a value within the range of 5 to 10 percent of the original unsaturation.

The butyl rubber employed in Examples I–IV of this disclosure was GR–I–18 while GR–I–217 and GR–I–218 were used in Example V and GR–I–17 in Example VI. Butyl rubber is well known in the art and includes isoolefin/diolefin copolymers prepared by the low temperature polymerization of a major proportion of an isoolefin and a minor proportion of an open-chain conjugated diolefin according to the usual method of polymerizing such monomers as disclosed in detail in U.S. Patents 2,356,128, 2,356,129 and 2,356,130 to Thomas and Sparks. The products are rubbery plastic hydrocarbon polymers. The copolymers are commonly prepared by copolymerizing a major proportion of an isoolefin having from 4 to 7 carbon atoms with a minor proportion of an open-chain conjugated diolefin having from 4 to 8 carbon atoms, and the copolymer is desirably the copolymer of a major proportion of isobutylene with a minor proportion of isoprene. Preferably the copolymer comprises from 70 or 80 to 99½ parts by weight of an isomonoolefin such as isobutylene or ethylmethylethylene copolymerized with from ½ to 20 or 30 parts by weight of an open-chain conjugated diolefin such as isoprene; butadiene-1,3; piperylene; 2,3-dimethylbutadiene-1,3; 3-methylpentadiene-1,3; 2-methylpentadiene; hexadiene1,3; hexadiene-2,4; and the like. Typical examples of these synthetic rubbers are known to the trade as "GR–I," "butyl A," "butyl B," "butyl C," and "Flexon."

The butyl rubber is used without preliminary treatment. That is, it is not vulcanized prior to the mixing with the compounding or other ingredients, applied to the other material, and the laminate cured.

In the preparation of the butyl rubber-hydrogenated butadiene polymer blends, the amount of butyl rubber employed is generally in an amount up to 95 parts by weight per 100 parts total polymer, preferably between 10 and 50 parts by weight per 100 parts total polymer. The relative amounts of the polymers employed will be governed largely by the use of the product. The blending is preferably done on a mill, the components being milled until a homogeneous mixture is obtained.

When the polymer blends are to be employed as bonding agents for rubbers, it is necessary that various compounding ingredients be present. If desired, compounding ingredients may be incorporated into each polymer separately and the compounded polymers then blended, or a blend of the butyl rubber with the hydrogenated butadiene polymer may be prepared first and the compounding ingredients added to the blend.

Rubbery material to be employed in the manufacture of laminates, including the butyl rubber-hydrogenated butadiene polymer blends, is first compounded using a recipe that will give the desired cure, the compounded material is sheeted from the mill or compression molded to the desired thickness, the various plies are arranged, and the structure is vulcanized or cured. Curing is generally effected at a temperature in the range between 250 and 350° F. although much lower temperatures might be used in some instances where very fast curing recipes are employed. The curing time will depend upon the curing temperature and the compounding recipe. It will generally be in the range between 5 and 75 minutes.

The thickness of the sheet of the butyl rubber-hydrogenated polymer blend can vary widely depending on the use to which it is to be put. For bonding we prefer to use a sheet ranging from 0.001 to 0.1 inch in thickness.

Various types of laminates can be prepared using the bonding agents of this invention. With these bonding agents strong bonds are formed with both natural and synthetic rubbers such as butyl rubber, butadiene/acrylonitrile copolymers, butadiene/styrene copolymers, polybutadiene, and other rubbery homopolymers of conjugated dienes and copolymers of conjugated dienes with various copolymerizable materials.

As shown in Examples V and VI butyl rubber will give a strong bond when cured in contact with the hydrogenated butadiene polymer. The resulting laminates, where the hydrogenated material is the exposed layer, exhibit improved resistance to attach and subsequent degradation when exposed to sunlight and ozone. The laminates also have lower gas permeability than does butyl alone.

For the compounding of the hydrogenated polymer, we have discovered that mineral fillers give exceptionally good bond strengths. Examples of mineral fillers include titanium dioxide, silica, zinc oxide, aluminum oxide, barium sulfate, barium carbonate, calcium carbonate and clays such as kaolin, attapulgite, fuller's earth, and the like. Of these, titanium dioxide is frequently preferred.

The laminate can comprise two or more plies and can, if desired, be reinforced with fibers, threads, cloth, wire meshes and the like.

As many possible embodiments may be made of this invention without departing from the scope thereof, it is to be understood that all matter herein set forth is to be interpreted as illustrative and not as unduly limiting the invention.

We claim:

1. An article of manufacture comprising a laminated structure, one of the laminae comprising butyl rubber prepared by polymerizing a major proportion of isobutylene with a minor proportion of isoprene and a second lamina consisting of a hydrogenated rubbery homopolymer of butadiene, the residual unsaturation of said hydrogenated polymer being not over 50 percent of the original unsaturation of the polymer.

2. The article of claim 1 wherein the unsaturation of said hydrogenated polymer is up to 10 percent of the original unsaturation of the polymer.

3. An article of manufacture comprising a laminated structure, one of the laminae comprising butyl rubber prepared by polymerizing a major proportion of isobutylene with a minor proportion of isoprene and a second lamina consisting of a blend of said butyl rubber and a hydrogenated rubbery homopolymer of butadiene, the residual unsaturation of said hydrogenated polymer being not over 50 percent of the original unsaturation of the polymer, said butyl rubber comprising up to 95 parts by weight per 100 parts of said blend, said blend having been made from uncured components.

4. A new composition of matter comprising an intimate mixture of
(1) a synthetic solid rubbery polymer of a major proportion of an aliphatic isoolefin having 4 to 7, inclusive, carbon atoms with a minor proportion of a conjugated diolefin having 4 to 8, inclusive, carbon atoms, and
(2) a hydrogenated product of a rubbery polymer selected from the group consisting of homopolymers of butadiene and copolymers of butadiene with not over 30 percent by weight of styrene, the residual unsaturation of said hydrogenated product being not over 50 percent of the original unsaturation of said polymer, said mixture having been prepared from uncured components.

5. The composition of claim 4 wherein said synthetic solid rubbery polymer constitutes up to 95 parts by weight per 100 parts of said synthetic solid rubbery polymer and said hydrogenated product combined.

6. The composition of claim 4 wherein said synthetic solid rubbery polymer constitutes 10 to 50 parts by weight per 100 parts of said synthetic solid rubbery polymer and said hydrogenated product combined.

7. A new composition of matter comprising
(1) an intimate mixture of a synthetic solid polymer of a major proportion of isobutylene and a minor proportion of isoprene, and
(2) a hydrogenated rubbery homopolymer of butadiene, the residual unsaturation of said hydrogenated rubbery homopolymer being not over 50 percent of the original unsaturation of said rubbery homopolymer, said mixture having been prepared from uncured components.

8. An article of manufacture comprising a laminated structure, one of the laminae comprising a rubber selected from the group consisting of natural rubber and rubbery synthetic polymers of conjugated dienes, a second lamina comprising a synthetic solid rubbery hydrocarbon polymer of a major proportion of an aliphatic isoolefin having 4 to 7, inclusive, carbon atoms with a minor proportion of a conjugated diolefin having 4 to 8, inclusive, carbon atoms per molecule, and a third, interposed, lamina comprising a mixture of said synthetic solid rubbery hydrocarbon polymer and a hydrogenated product of a rubbery polymer selected from the group consisting of homopolymers of butadiene and copolymers of butadiene with not over 30 percent by weight of styrene, the residual unsaturation of said hydrogenated product being not over 50 percent of the original unsaturation of said polymer, said mixture having been made from uncured components.

9. The article of claim 8 wherein said synthetic solid rubbery hydrocarbon polymer in said third lamina constitutes up to 95 parts by weight per 100 parts of said synthetic solid rubbery hydrocarbon polymer and said hydrogenated product of said rubbery polymer combined.

10. The article of claim 8 wherein said synthetic solid rubbery hydrocarbon polymer in said third lamina constitutes 10 to 50 parts by weight per 100 parts of said synthetic solid rubbery hydrocarbon polymer and said hydrogenated product of said rubbery polymer combined.

11. An article of manufacture comprising a laminated structure, one of the laminae comprising a synthetic rubbery polymer of a major proportion of butadiene and a minor proportion of styrene, a second lamina comprising a synthetic solid rubbery hydrocarbon polymer of a major proportion of isobutylene with a minor proportion of isoprene, and a third, interposed, lamina comprising a mixture of said synthetic solid rubbery hydrocarbon polymer and a hydrogenated rubbery homopolymer of butadiene, the residual unsaturation of said hydrogenated homopolymer being not over 50 percent of the original unsaturation of said homopolymer, said mixture having been prepared from uncured components.

12. An article of manufacture comprising a laminated structure, one of the laminae comprising butyl rubber prepared by polymerizing a major proportion of an aliphatic isoolefin having 4 to 7, inclusive, carbon atoms with a minor proportion of a conjugated diolefin having 4 to 8, inclusive, carbon atoms and a second lamina comprising a hydrogenated product of a rubbery polymer selected from the group consisting of homopolymers of butadiene and copolymers of butadiene with not over 30 percent by weight of styrene, the residual unsaturation of said hydrogenated product being not over 50 percent of the original unsaturation of the polymer.

13. An article of manufacture comprising a laminated structure, one of the laminae comprising butyl rubber prepared by polymerizing a major proportion of an aliphatic isoolefin having 4 to 7, inclusive, carbon atoms with a minor proportion of a conjugated diolefin having 4 to 8, inclusive, carbon atoms and a second lamina comprising a blend of
(1) a hydrogenated product of a rubbery polymer selected from the group consisting of homopolymers of butadiene and copolymers of butadiene with not over 30 percent by weight of styrene, the residual unsaturation of said hydrogenated product being not over 50 percent of the original unsaturation of the polymer, and
(2) said butyl rubber, said butyl rubber comprising up to 95 parts by weight per 100 parts of said blend, said blend having been made from uncured components.

References Cited in the file of this patent

UNITED STATES PATENTS

| | | |
|---|---|---|
| 2,467,322 | Lightbown | Apr. 12, 1949 |
| 2,541,550 | Sarbach et al. | Feb. 13, 1951 |
| 2,638,460 | Crouch | May 12, 1953 |
| 2,649,134 | Steinle | Aug. 18, 1953 |
| 2,676,636 | Sarbach | Apr. 27, 1954 |
| 2,693,461 | Jones | Nov. 2, 1954 |
| 2,786,047 | Jones et al. | Mar. 19, 1957 |
| 2,813,809 | Jones et al. | Nov. 19, 1957 |

OTHER REFERENCES

Rubber Chem. Technology, vol. 27, No. 1, January–March 1954, pages 74–87.